US005762702A

United States Patent [19]
Guy

[11] Patent Number: 5,762,702
[45] Date of Patent: Jun. 9, 1998

[54] MECHANICAL DISINTEGRATION OF WHOLE DISCARDED TIRES USED AS AGGREGATES FOR CONCRETE COMPOSITIONS

[76] Inventor: Miriam T. Guy, 12713 W. Maplewood Dr., Sun City West, Ariz. 85375-4619

[21] Appl. No.: 851,196

[22] Filed: May 5, 1997

[51] Int. Cl.⁶ .......................... C04B 18/04; C04B 18/22
[52] U.S. Cl. .................. 106/697; 106/711; 106/802; 106/816; 106/DIG. 1; 106/643; 106/644
[58] Field of Search ........................ 106/643, 644, 106/705, 711, 708, 724, 697, 802, 816, DIG. 1; 264/DIG. 49; 524/650

[56] References Cited

U.S. PATENT DOCUMENTS

| | | | |
|---|---|---|---|
| 3,700,615 | 10/1972 | Scott | 260/2.3 |
| 3,930,100 | 12/1975 | McDonald | 428/323 |
| 4,035,192 | 7/1977 | Busacca | 106/90 |
| 4,058,405 | 11/1977 | Snyder et al. | 106/87 |
| 4,731,136 | 3/1988 | Risi | 156/64 |
| 5,244,304 | 9/1993 | Weill et al. | 404/67 |
| 5,290,356 | 3/1994 | Frankowski | 106/726 |
| 5,312,858 | 5/1994 | Folsom | 106/697 |
| 5,385,401 | 1/1995 | Nath | 366/7 |
| 5,391,226 | 2/1995 | Frankowski | 106/696 |
| 5,456,751 | 10/1995 | Zandi et al. | 106/724 |
| 5,472,750 | 12/1995 | Miller | 428/2 |
| 5,525,153 | 6/1996 | Cosola | 106/711 |

OTHER PUBLICATIONS

Kosmatka et al., "Design and Control of Concrete Mixtures", Thirteenth edition, PCA, p. 65, (no month) 1988.

*Primary Examiner*—Michael Marcheschi

[57] ABSTRACT

Whole waste tires are shredded and ground down to particulates and used as aggregates for concrete compositions in the construction field.

4 Claims, No Drawings

MECHANICAL DISINTEGRATION OF WHOLE DISCARDED TIRES USED AS AGGREGATES FOR CONCRETE COMPOSITIONS

BACKGROUND: FIELD OF THE INVENTION

This invention relates to a concrete composition containing whole waste tire products, such as rubber, fiber, and steel cords, shredded as particulates and used as aggregates.

BACKGROUND OF THE INVENTION

Accumulations of waste rubber tires have become a monumental environmental problem for the country. Landfills are overflowing and environmentals standards are being tightened due to concerns of contaminated groundwater, fire hazards, pollution, and other health hazards. Waste tires are not biodegradable. They provide insect breeding grounds, increasing the spread of mosquito-borne diseases.

It is estimated that about three billion tires occupy landfills and stockpiles. Approximately 280 million additional waste tires are generated each year in the United States alone.

In desperation, almost all states have enacted laws, proposed legislation, or adopted proposals to regulate the collection and disposal of waste tires. Many states collect license fees or special taxes to defray the cost of handling the waste tires.

The difficulty in processing waste tires has been in separating each tire into its multiple components. Tires are typically reinforced with belts of steel wire and reinforcing fabric or fiber, and include a metal beading strip around their inner diameter. Previous inventions have failed to address recycling all of the materials in the waste tire. U.S. Pat. No. 5,391,226, dated Mar. 1, 1994, Frankowski, and U.S. Pat. No. 5,290,356, dated Feb. 21, 1995, Frankowski, using rubber crumb-reinforced cement concrete, fail to use the fibers and steel derived from the waste tires. Separating these materials from the rubber entail costly and complicated procedures, and when completed, provide additional waste materials, unless they are recycled.

U.S. Pat. No. 5,456,751, dated Oct. 10, 1995, Zandi et al, addresses particulate rubber included concrete compositions. This prior art invention notes that the tire tread, or rubber portion, is preferably removed from any cords present in the tire structure. Further, the rubber is subjected to additional processing to wash the rubber material prior to using the it in the composition. This prior art also neglects to include the steel cords or beads with the components for the concrete mixtures according to the present invention.

SUMMARY OF THE INVENTION

Concrete compositions are provided which contain recycled rubber, fibers, and steel cords, from waste rubber tires, as particulates, in amounts between 0.15 and about 30 percent by weight of the concrete composition. The concrete composition contains cement, water, fine and coarse aggregates, and fly ash and a superplasticizer as admixtures.

DETAILED DESCRIPTION OF THE INVENTION

The cement-concrete compositions of this invention comprise cement, aggregates, waste rubber, fibers, and steel particulates, and admixtures of fly ash and a superplasticizer. This composition significantly reinforces the structure, and provides resistance to cracking and improved shock wave absorption. The concrete composition of this invention meets ASTM C-39 standards for strength.

The waste rubber, fibers and steel have a particulte size such that approximately 55–75 weight percent of the particles pass through a ⅜" (9.5 mm) sieve, about 25–45 weight percent of the particles pass through a No. 4 (0.187", 4.75 mm) sieve, and from about 0–10 weight percent of the particles pass through a No. 8 (0.0094", 2.36 mm) sieve. Generally, less than about 2 weight percent of the particles are retained on a 0.5" (12.5 mm) sieve.

The preferred embodiments of this invention are described below.

The concrete of the present invention consists of 100 parts by weight of cement, from about 100 to 200 parts by weight of sand, from about 200 to 400 parts by weight of coarse aggregate, and from about 15 to 30 parts by weight of rubber, fibers, and steel, from about 20–70 parts by weight of water, plus small quantities of fly ash and a superplasticizer, such as POZZILITH 400N, a product of Master Builders, Inc., Cleveland, Ohio, as admixtures. The relative proportions of each constituent can vary depending upon the desired compressive strength sought from the final cured composition.

The rubber, fiber, and steel particulates used in the concrete compositions of the present invention preferably have an average particle size of ⅜" or 9.5 mm, although particle size may vary according to the application.

Test cyclinders of concrete were made as described above, and were found to have a compressive strength of 4000 psi at 7 days.

SUMMARY AND SCOPE

The present invention avoids the deficiencies of the prior art and provides a viable and an effective method for recycling whole waste tires, thus not creating more waste. The present invention is directed at mechanical disintegration of the waste tires through processes of metal shredding and grinding, thereby reducing as much as 40–45 tons of waste tires per 8-hour workday. According to this invention, whole waste tires are reduced to rubber, fiber, and steel particulates, providing an aggregate for concrete compositions.

There is a significant environmental need for an efficient and cost-effective method of recycling tires. The present invention discloses a method to fill this need and is a useful, practical solution to the problem of waste tire disposal.

What is claimed is:

1. A concrete composition made from a mixture consisting essentially of:

(a) 100 parts by weight of cement;

(b) 100–200 parts by weight of sand;

(c) 200–400 parts by weight of coarse aggregates;

(d) 15–30 parts by weight of shredded particulates comprising rubber, fibers and steel obtained from whole waste tires;

(e) 20–70 parts by weight of water;

(f) fly ash;

(g) and a superplasticizer.

2. A concrete composition of claim 1 wherein said particulates have a particle size distribution such that from about 55–75 weight percent of the particles pass through a ⅜" sieve and about 25–45 weight percent of the particles pass through a No. 4 sieve.

3. The concrete composition of claim 2 wherein sand particle size distribution further comprises particulates such that from 0–10 weight percent of the said particles pass through a No. 8 sieve and less than 2 weight percent of the particles are retained on a 0.5"sieve.

4. The concrete composition of claim 1, wherein said composition has a compression strength of 4000 psi.

* * * * *